Aug. 25, 1953    L. C. KAHLE    2,649,659
MACHINE FOR FORMING GLASS ARTICLES
Filed Jan. 2, 1951    9 Sheets-Sheet 1

INVENTOR
*Louis C. Kahle*
BY
*Norman N. Holland*
ATTORNEY

Patented Aug. 25, 1953

2,649,659

UNITED STATES PATENT OFFICE 2,649,659

MACHINE FOR FORMING GLASS ARTICLES

Louis C. Kahle, Teaneck, N. J., assignor to Kahle Engineering Company, North Bergen, N. J., a copartnership Application January 2, 1951, Serial No. 204,037

24 Claims. (Cl. 49—7)

The present invention relates to a machine for forming hollow glass articles, and more particularly to one for forming glass articles such as small bottles, ampoules or light bulbs from lengths of glass tubing.

Articles such as those mentioned above must be manufactured at high speeds and by machinery that is as fully automatic as possible, otherwise manufacturing costs of the articles are excessive and their fields of use curtailed. While machines have been utilized for manufacturing such articles, they have been relatively complicated and have required an objectionable amount of observation and attendance while in production. In addition, their complicated features have required an objectionable amount of maintenance to keep them in operating condition.

The present invention aims to overcome the above and other difficulties by providing a new and improved machine or device for making glass articles from tubing which is of relatively simple construction and operation, and which machine may be operated at high production speeds. The invention further contemplates the provision of such an improved device which is more nearly fully automatic in operation.

An object of the present invention is to provide a new and improved device for manufacturing articles of the class described.

Another object of the invention is to provide an improved device for manufacturing articles from tubing which is relatively simple in construction and operation.

Another object of the invention is to provide an improved device for transforming tubing into articles, which is almost entirely automatic in operation.

Another object of the invention is to provide an improved device for manufacturing articles from tubing, which may operate at relatively high production speeds.

Another object of the invention is to provide new and improved means for delivering air to the articles being manufactured to assist in shaping them.

Another object of the invention is to provide new and improved means for controlling the operation of tube-holding chucks during manufacture of the tube into articles.

Still another object of the invention is to provide new and improved means for opening and closing molds used in connection with shaping the articles.

A still further object of the invention is to provide new and improved means for automatically returning tube holding carriages to any initial position when a length of tubing is almost used up.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figures 1, 2, 5:
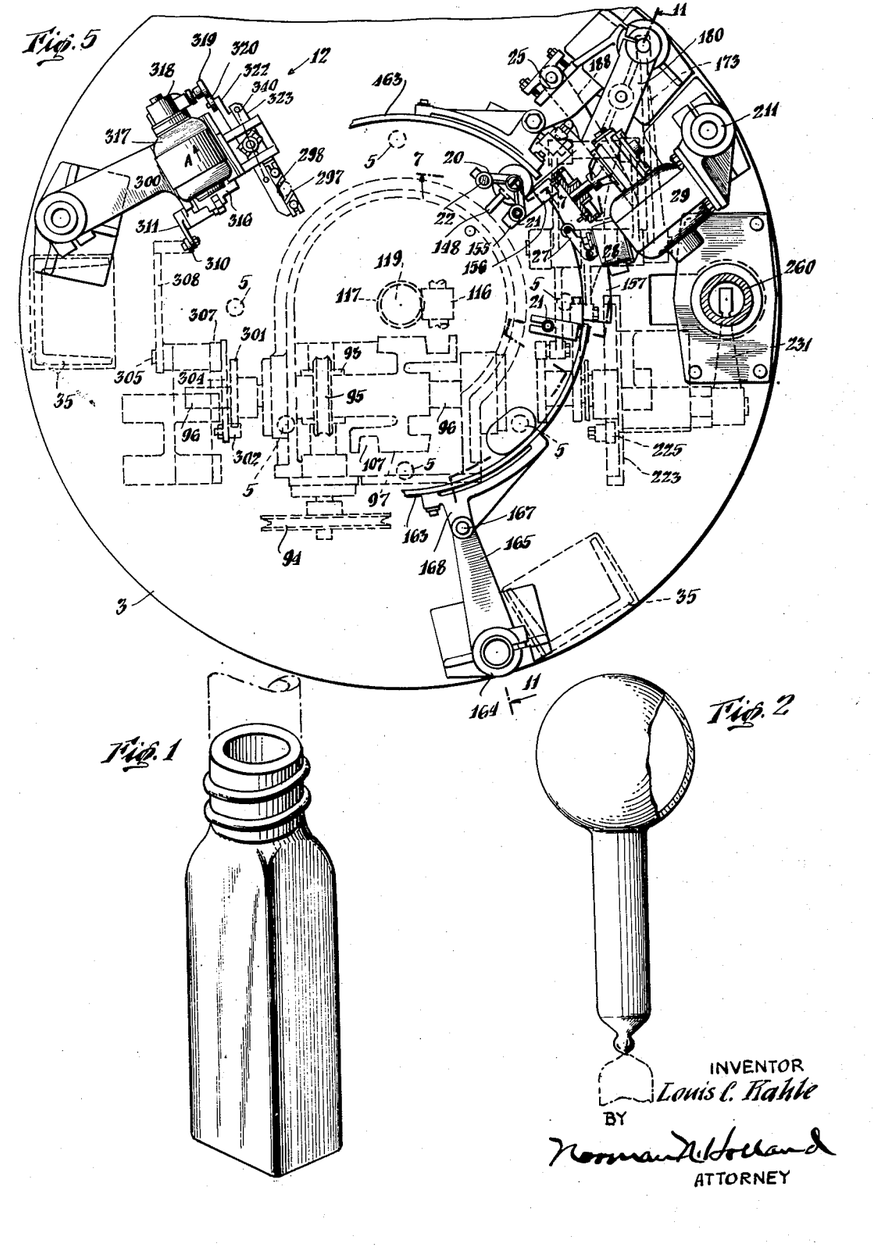
Figs. 1 and 2 show examples of articles which may be manufactured by the present machine.
Fig. 5 is a top plan view of the machine, with the turret removed and various other upper portions of the machine removed for purposes of clarity.

The present machine is adapted to transform relatively long and straight lengths of glass tubing into bottles, bulbs or the like, such as illustrated in Figs. 1 and 2. The article of Fig. 1 is a small bottle of square cross section, and the article of Fig. 2 is shaped into a small electric light bulb, the glass part to be later cut off at appropriate length and provided with the necessary additional filament, base, etc. The particular shapes illustrated in Figs. 1 and 2 are chosen merely for illustrative purposes, and it will be clear that the machine may be utilized to manufacture articles of different shapes than those shown.

Figure 3:
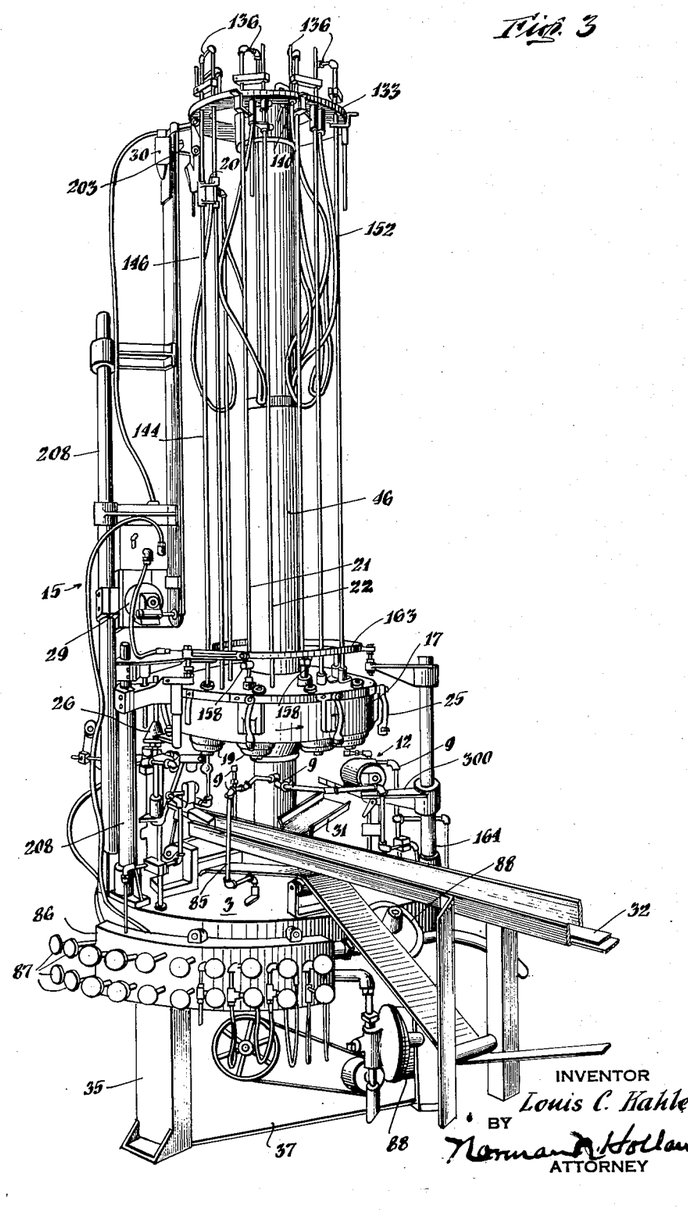
Fig. 3 is a perspective view, showing a preferred embodiment of the present invention.

Described generally the present machine comprises (Figs. 3–5) a stationary table 3 supporting molding means 6 and adjacent air delivery means 7 which cooperate to shape lower portions of glass tubes into articles, feeding means 8 for moving the glass tubes a step downwardly subsequent to molding the lower ends thereof, severing means 12 for separating formed articles from lower ends of the glass tubes, various conduits and burners 9 adapted to heat lower portions of the glass tubes to render them sufficiently plastic for shaping and severing, and elevating mechanism 15 for moving the tube-supporting means to initial feeding position.

A rotatable turret 17 above the stationary table has a plurality of circumferentially spaced tube guiding means and chucks 19, through which lengths of glass tubing may extend. Lower portions of the tubing are disposed below the turret and are acted on at different stations by the gas flames, molds and a severing means to produce the desired bottles, bulbs, or the like.

Upper portions of each length of tubing connect with carriages 20 which comprise the tubing supporting means and which are movable lengthwise of a pair of upright members 21 and 22; one upright member of each pair is movable up and down and serves to feed a carriage 20 toward the turret in step-by-step manner so that as the lower part of the tube is used up, more will be fed down.

One upright member 21 of each pair is also hollow so that air may pass through it and a flexible conduit to the carriage 20 and thence to the inside of the glass tubing. At appropriate intervals the air supply device 7 (Fig. 4) moves against a portion of the turret 17 to deliver the air which passes through the hollow member 21 to the carriage 20 and thence through the glass tube itself to the bottom portion thereof. The lower part of the glass tube will have been heated by the gas flames to a plastic condition and will be enclosed by the molds 6 prior to the air reaching it, so that when the air does get there the pressure of the air may expand or inflate the softened glass to make it conform to the shape of the mold walls.

To insure uniform softening of the lower part of the glass tube it is desirable that the tube be rotated during heating of it. This is achieved by the rotatable chucks 19. However, where a non-circular article such as the square bottle of Fig. 1 is to be manufactured, the tube should not be rotated while enclosed by the molds 6. Each chuck is therefore provided with an operating member 25 for releasing the grip of the chuck jaws on the tubing while the latter is enclosed within the molds 6, the chuck operating members 25 cooperating with a cam 26 adjacent the molding station to release the length of tubing while their lower ends are being shaped. The operating members 25 are also opened subsequent to the molding station so that the tubing may be readily fed downwardly a desired distance for cutting off and for shaping a subsequent article.

When a length of tubing has been almost entirely used up, a portion of the means which supports it on the upright members 21 and 22 sets into operation the elevating mechanism 15 that automatically returns the tube supporting means to an upper initial position. When at this upper location a fresh length of tubing may be readily inserted into the machine, it is not necessary for an operator to raise a carrier 20 manually or do anything else to place the machine in condition for insertion of fresh lengths of tubing.

Lower portions of the tubing, subsequent to their formation into articles as in Figs. 1 and 2, are severed from the remainder of the tubing and fall onto a guide chute 31, which directs them to a conveyor belt 32, that in turn moves them away from the machine.

For convenience, the machine will now be described in detail in the following order: (1) Table and turret, (2) Main drive, (3) Tube supporting and feeding, (4) Molding means and air delivery, (5) Elevating mechanism, (6) Severing of tubing, (7) Operation.

(1) *Table and turret*

Figure 6:
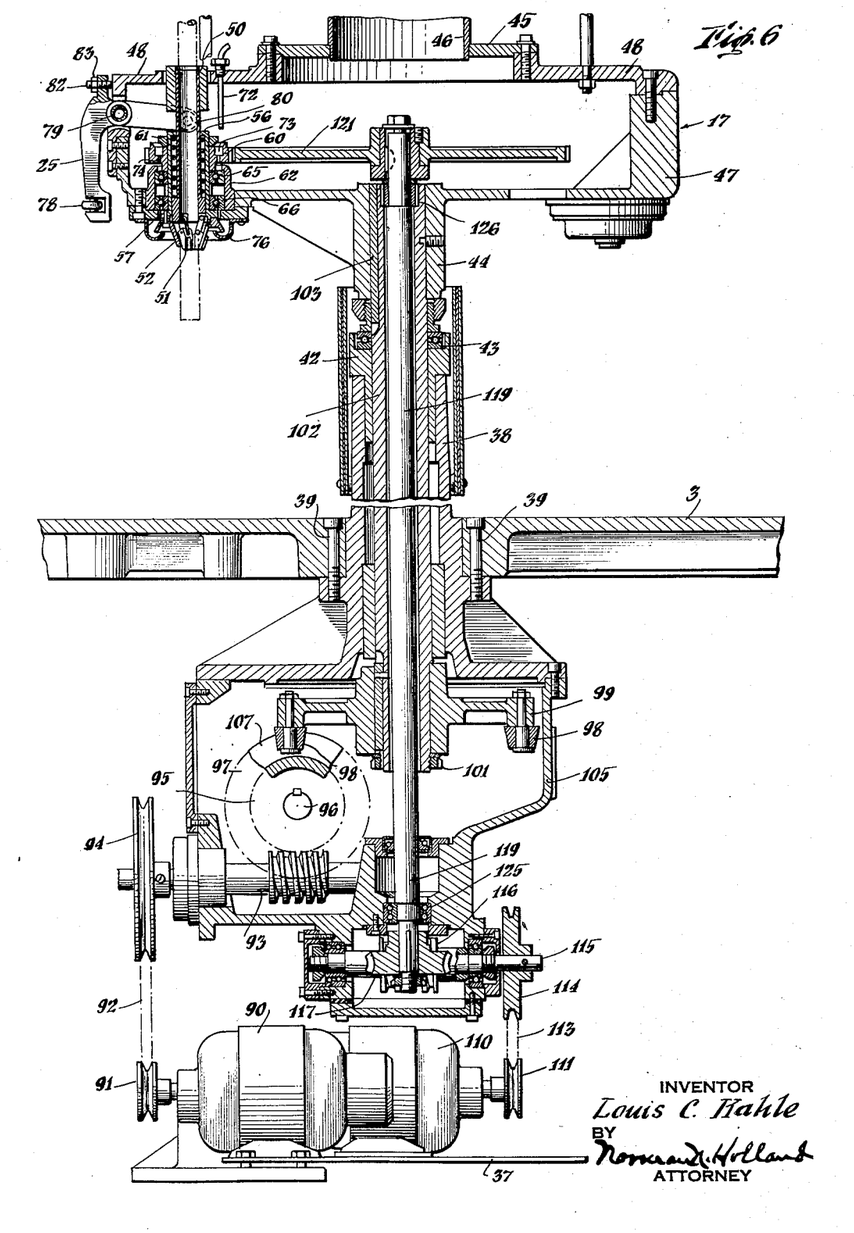
Fig. 6 is a fragmentary vertical sectional view showing the turret and lower portions of the present machine.

As shown (Figs. 3 and 6), the stationary table 3 is supported by legs 35, which also support drive motor platform 37. The turret 17 is rotatably supported on a column 38 that is fastened to the table 3 by bolts 39; a collar 42 resting against the upper end of the column 38 serves as a seat for a thrust bearing 43, which in turn supports the hub 44 of turret 17.

Figure 6A:
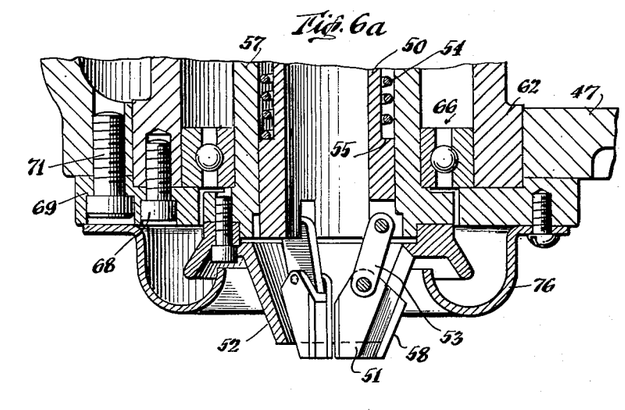
Fig. 6a is an enlarged sectional view of a portion of a chuck shown at the upper left portion of Fig. 6.

The turret comprises a hollow member 47 to which is bolted a cover member 48. At spaced intervals about the turret are located the means for guiding and holding lengths of glass tubing that are to be manufactured into forms similar to those of Figs. 1 and 2. As shown at the upper left portion of Figs. 6 and 6a this means includes a tubular guide member 50 that extends through openings in the turret bottom and cover members 47 and 48, and has gripping jaws 51 operatively connected by links 53 with its lower portion for engaging with exterior surfaces of a length of glass tubing. The jaws are shown fully closed in Figs. 6 and 6a as no glass tube is in the guide member.

The jaws 51 are urged toward closed position against a length of tubing by a conical member 52 and a spring 54 interposed between a shoulder 55 on the guide member 50 and a second shoulder 56 on an outer sleeve member 57. The outer sleeve member 57 has a gear 60 retained on its upper portion by a threaded collar 61 and the sleeve 57 is rotatably supported within a housing member 62 by spaced ball bearings 65 and 66. The housing 62 is secured to the lower turret member 47 by bolts 68, retaining ring 69 and bolts 71. As the guide member 55 and chuck jaws 52 are rotated, upon rotation of the gear 60, a length of glass extending through the guide member is also rotated with it and the chuck jaws.

Lubrication of the ball bearings 65 and 66 may be provided through a pipe 72, which has an open end terminating above and adjacent a lubricating channel 73 at the upper part of the chuck gear 60; oil may be supplied to the pipe 72 from any suitable lubrication system and finds its way down through the channel 73 of the gear 60 and the outlet passage 74 to the ball bearings. An annular member 76 may be located under the lower part of the chuck to receive oil that may find its way past the ball bearings.

The chuck jaws may be opened by the bell crank operating members 25 through the intermediation of inner guide member 50. When a chuck operating member 25 has a roller 78 adjacent its lower end moved inwardly, the operating member rotates about a mounting pin 79 and the inner end of the operating member moves upwardly, together with the tube guiding member 50 with which it is rotatably connected by a pin 80. During this upward movement, the chuck spring 54 is compressed and the chuck jaws 51 may spread apart as they are lifted toward larger diameter portions of the conical member 52 and as the shoulders 58 on the jaws travel along the conical member 52. When the operating member 25 is released, the spring 54 pressing downwardly against the shoulder 55 of the tubular guiding member 50 moves the latter member downwardly and causes the chuck jaws to move toward smaller diameter portions of the conical member 52; this causes the jaws to move inwardly to grip against a length of glass tubing extending through the guide member 50. An adjusting screw 82 may be threaded into a portion of the operating member 25 for selectively determining the amount of movement of the operating member, this screw abutting at its inner end against an outer portion of the turret cover member 48. A lock nut 83 may be threaded onto the adjusting screw so as to retain it in a set position.

While any suitable number of chucks such as those described above may be used, eight chucks spaced equally around the turret will give good results.

The turret is intermittently rotated or indexed so that the chucks and lengths of glass tubing extending through them are advanced in step-by-step manner to different stations where the lower part of the tube is heated or subjected to forming or cutting operations. At one station the lower part of the glass tube is enclosed within a mold and subjected to air pressure so as to expand it to conform with the shape of the mold. At a following station the glass tubing is fed a step downwardly. At another following station the lower formed part of the tubing is severed from the portions above it. At still other stations, appropriately positioned on the table 3 adjacent the path of the chucks 19, the lower portions of the glass tubing are subjected to the gas jet flames which heat them to desired degree of plasticity. The gas burners are not shown in detail, as any suitable ones may be used. Gas, oxygen, or air may be supplied to the burners in suitable proportions through conduits 85, manifold 86 bolted to table 3, control valves 87, and pressure regulators 88. In order to avoid the possibility of confusion the conduits, gas burners and other equipment normally carried by the stationary table 3 are omitted from Fig. 6, but such devices are shown in such as Figs. 3 and 5.

The turret cover member 48 supports a mounting plate 45, to which is welded or otherwise secured an upright central column member 46, and upright guide members 21 and 22. These parts will be later described under the heading "(3) Tube supporting and feeding."

(2) Main drive

Intermittent rotary movement or indexing of the turret 17 is obtained by (Figs. 5 and 6) drive motor 90 through the intermediation of pulley 91, belt 92, pulley 94, drive shaft and worm 93, worm gear 95 keyed to index cam shaft 96, index cam 97 also keyed to index cam shaft 96, rotatable member 99 which is keyed by key 100 to hollow shaft 102 and has depending cam rollers 98 movable successively into registry with cam groove 107, and key 103 which fixedly secures the hub 44 of the turret to the hollow shaft 102. The roller-carrying member 99 is held up in position on the hollow shaft 102 by locknut 101.

The cam groove 107 is adapted to receive one of the depending rollers 98 at a time and may be shaped to cause slow acceleration and deceleration of the shaft 102 and the turret 17, with rapid intermediate movement; thus abrupt shocks at stopping and starting are avoided. Where eight chucks 19 are employed on the turret 17 there may be eight corresponding rollers 98 on the rotatable member 100, and each time the cam 97 makes a complete revolution one of the rollers may travel the groove 107 and serve to advance the turret one-eighth of a complete revolution. Thus, as the chucks and glass tube guides are moved by the turret 17 about a closed path they may present lower portions of glass tubes to the different work stations.

Rotation of the chucks and tube guiding members is preferably achieved by a separate drive motor 110 through pulley 111, belt 113, pulley 114 keyed to shaft 115, worm 116, worm gear 117, drive shaft 119, and gear 121, that is keyed to the upper end of the drive shaft 119 and meshes with chuck gear 61. The drive shaft 119 may be rotatably supported adjacent its lower end by a ball bearing 125 and adjacent its upper end by a needle bearing 126. As the drive motor 110 rotates it turns the large drive gear 121 and spins the chuck gear 60 to rapidly rotate the glass tubing which extends through the guide member 50 and is gripped by the chuck jaws 51.

Preferably the driving gears, indexing cams, indexing rollers and associated mechanism are enclosed within a housing 105, which may be partially filled with oil for lubrication purposes.

(3) Tubing support and feed

The means for supporting lengths of glass tubing adjacent their upper ends is shown more particularly in Figs. 3, 4, 5 and 7. As there shown, the plurality of elongated members 21 and 22, extend upwardly from the turret, each of these members being secured to the turret cover portion 48 adjacent one of the chucks and tube guide members. One of these elongated members (22) may be fixedly bolted to the turret cover 48. The other member is preferably hollow and fits into a socket 129 that extends through a bushing 130 bolted to the turret cover portion 48. The hollow member 21 preferably fits closely at its exterior against the inner walls of the socket member 129 and is free to move up and down within the socket member in connection with feeding the lengths of glass tube downwardly. The socket 129 has an elongated recess 132 therein which serves to connect the interior of the hollow member 21 with a lateral opening or passageway 134 through the turret cover portion 48. The recess 132 and the passageway 134 together form a receiving conduit. Adjacent their upper ends the upright members 21 and 22 extend through a flange 133 that is fastened to the upper end of hollow central column member 46. The upper end of each hollow guide member 21 is connected with a separate lateral pipe 136 and the ends of these pipes are connected with lengths of rubber tubing 152 that extend through openings 140 in the flange 133 and are joined with nipples 148 (Fig. 5) of the carriage 20 that moves along the upright members 21 and 22. Air forced into the lateral passageway 134 may flow therefrom down through the recess 132 into the bottom end of the hollow upright member 21, up through the latter member, through lateral pipe 136, through rubber tube 152 and nipple 148 into a carriage (Fig. 5).

The upright members 21 and 22 are parallel with each other and cooperate in supporting and guiding the movable carriages 20 which comprise the tube supporting means and which are to be connected with upper ends of lengths of glass tubing. Each carriage comprises (Figs. 7 and 7a) a hollow body portion 135 having apertured projections 137, 138 and 139 that fit around the upright guide members 21 and 22. Two of the apertured projections (137 and 138) extend around the rod 22 and have recesses containing friction plugs 141 held against the exterior of the rod by springs 142 and screw plugs 143. The other apertured projection 139 extends around the hollow rod 21. The friction plugs permit raising and lowering of the carriage lengthwise of the guide members 21 and 22, but tend to ease its descent when supporting member 155 is lowered along the rod 21.

A hollow pin 145 supported by the carriage 20 projects below it for connection with a length of rubber tubing 146. The latter length of rubber tubing may fit over the upper end of a piece of glass tubing 144 to support it on the carriage and conduct air from the interior of the hollow pin into the interior of the tubing. A plug 147 threaded into an opening over the pin 145 prevents unintentional removal of it. The nipple 148 (Fig. 5) extends outwardly from one side of the carriage body 135 and provides communication with the hollow interior thereof so that air may flow in through the nipple 148 at a location intermediate shoulders 149 of the pin member 145, through lateral openings 150 in the pin member and down through the hollow interior of the pin member into the connected length of rubber tube 146 and the glass tubing 144. The air may then pass down through the length of tubing itself to expand the lower end which is enclosed within molding jaws.

The carriage 20 includes a supporting member or latch 155 and is supported firmly in desired position on the upright members 21 and 22 by the latch 155 shown extending around the hollow upright member 21. This latch is rotatably connected with the carriage projection 139 by a pin 154 and normally occupies a downwardly tilted position on the member 21. This tilting causes inner surfaces which form an aperture 153 in the holding member to engage with the exterior of the member 21. In this position the "bite" of the supporting member 155 against the rod 21 serves to retain the carriage in a fixed position on the members 21 and 22. As previously brought out, the member 21 is movable longitudinally up and down; when it is moved upwardly the supporting member 155 turns about its pin 154 and the "bite" on the rod 21 is released. During this movement the carriage 20 remains in position. When the upright member 21 is moved downwardly, the supporting member 155 again bites against the upright member and the carriage 20 is moved down. Raising and lowering the upright member 21 is thus effective to move the carriage and a connected length of glass tubing downwardly since a downward ratchet-like action takes place between upright member 21 and supporting member 155, the amount of downward movement corresponding to the distance that the upright member moves in either direction. The latch 155 with the aperture 153 thus provide a ratchet connection between carriage 20 and rod 21.

In the sequence of operations downward feeding of the carriages occurs after the turret moves them past the molding station 6, but for clarity it is deemed best to describe the feeding means at this time.

Lifting and lowering of the upright member 21 is achieved by corresponding movement of a channel shaped track portion 157 (Figs. 4, 7, 11) which receives intermediate its upper and lower flanges a roller 158 that is held in fixed position on the upright member 21 by an arm or bracket 159. The arm or bracket 159 is preferably located so that the roller 158 travels for most of its path of movement with the turret beneath a fixed rail 163, the rail being supported on the table 3 at appropriate locations by posts 164, brackets 165, adjusting screws 167 and threaded bracket members 168. The rail 163 holds the roller 158 and its upright member 21 against unintentional raising.

The channel shaped track 157 is located adjacent a cut out section of the rail 163 and receives the rollers 158 as they pass from beneath the fixed track 163.

The track 157 may be raised and lowered by (Figs. 5, 11 and 14), a cam 170, secured to the index cam shaft 96, through the intermediation of roller 171, arm 172 which extends about shaft 176 that is rotatably carried by bracket 169, adjusting means 174 which connects arm 172 with horizontally spaced arm 175 (Fig. 14), arm 175 secured to shaft 176, shaft 176, arm 173, link 177, upright member 178 and bracket member 180.

Figure 11:
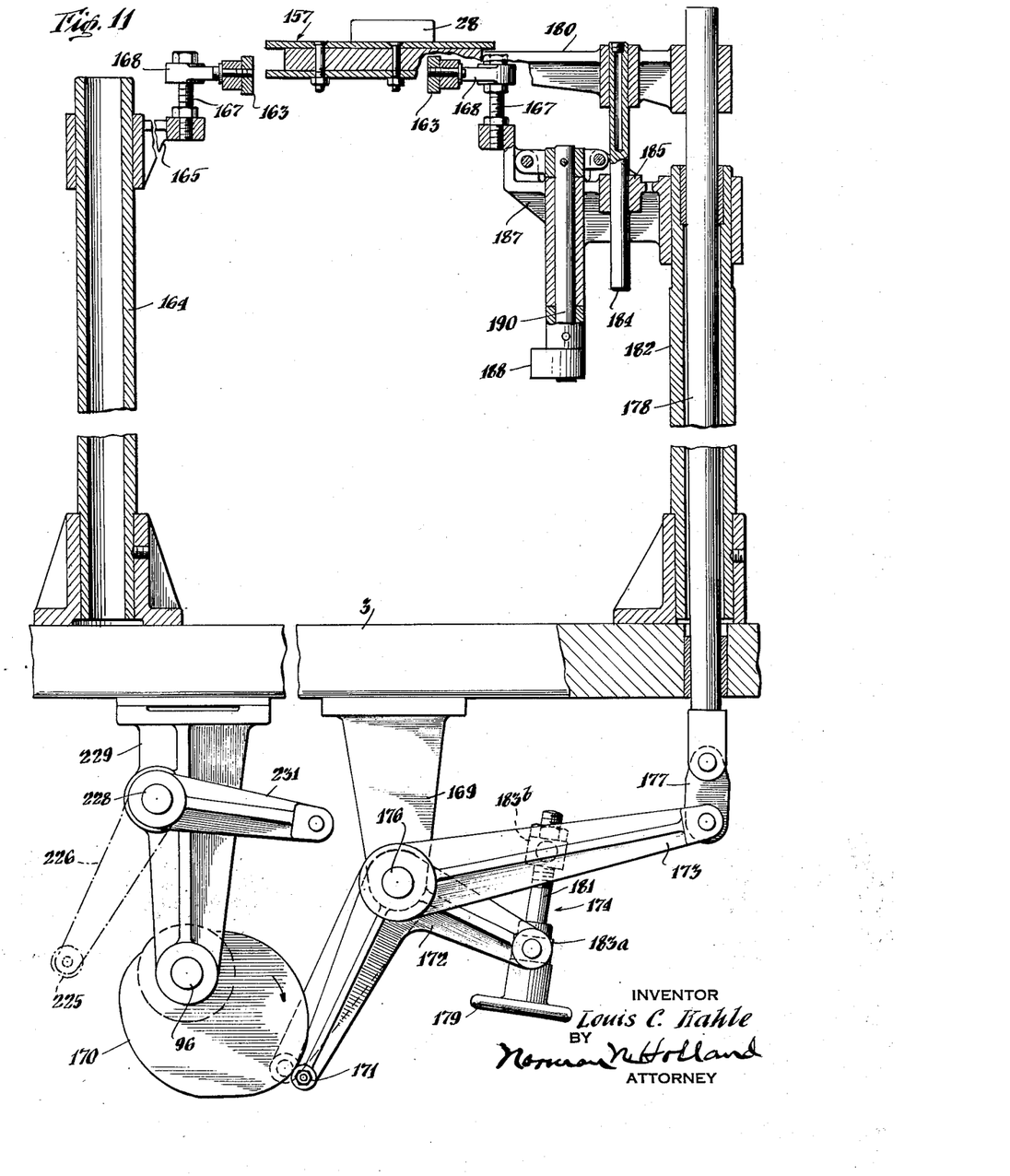
Fig. 11 is a fragmentary vertical sectional view taken along line 11—11 of Fig. 5, showing means for feeding the length of glass tubing.

The adjusting means 174 serves to adjustably interconnect the horizontally spaced operating arms 172 and 175 so that an opposite end of the former may be set to contact and leave the periphery of operating cam 170 at desired instants to thereby vary the length of strokes of the track-elevating bracket 180 and the time at which it commences to move upwardly. As an adjusting handle 179 is rotated, a screw member 181 connected therewith moves the threaded adjusting blocks 183a and 183b together or apart, depending upon the direction of rotation of the handle and screw member, and thereby brings together or spreads apart adjacent ends of the horizontally spaced arms 172 and 175. When the threaded adjusting blocks 183a and 183b are widely apart, opposite ends of the arms 172 and 175 are relatively close to each other, and roller 171 may travel around the lifting cam 170 for a maximum distance, so that this lifting cam may commence elevating the track 157 at an early instant. When the adjusting blocks 183a and 183b are close together opposite ends of the arms 172 and 175 are spaced relatively far apart, so that a roller 191 on the arm 175 may contact a portion of the circular cam 192 and hold the roller 171 of the other arm 172 away from the surface of the lifting cam 170 until a sufficiently high portion of the lifting cam comes into contact with the roller 171. By suitably adjusting the handwheel 179, the roller of arm 172 may be made to contact the cam 170 at desired instants, and the distance through which the track 157 is raised and lowered may be varied. As shown in Fig. 11, the highest point on the cam 170 is effective against the roller 171 and the track 157 is therefore at a maximum elevation.

The upright track elevating member 178 may extend through the table 3 and be guided by bearings located within a column member 182. The bracket member 180 and the vertically movable track 157 may be held against horizontal movement by a guide pin 184 extending through an opening 185 of bracket 187, which is in turn secured to an upper portion of the column member 182.

It will be recalled that the chuck jaws 51 normally hold and rotate lengths of glass tubing; therefore the chuck jaws should be opened to release the glass tubing before the track 157 starts to move downwardly an upright member 21 and carriage 20, with its connected length of glass tubing. This is achieved by a stationary cam 188 supported by shaft 199 and positioned to contact rollers 78 of the chuck operating members 25 to release the chuck jaws. The cam 188 is preferably so positioned along the path of travel of the chucks that it actuates the chuck operating member 25 shortly prior to downward movement of the vertically reciprocable track 157; this may be shortly before the roller 171 reaches the highest point on operating cam 170.

(4) *Molding means and air delivery*

Figure 4:
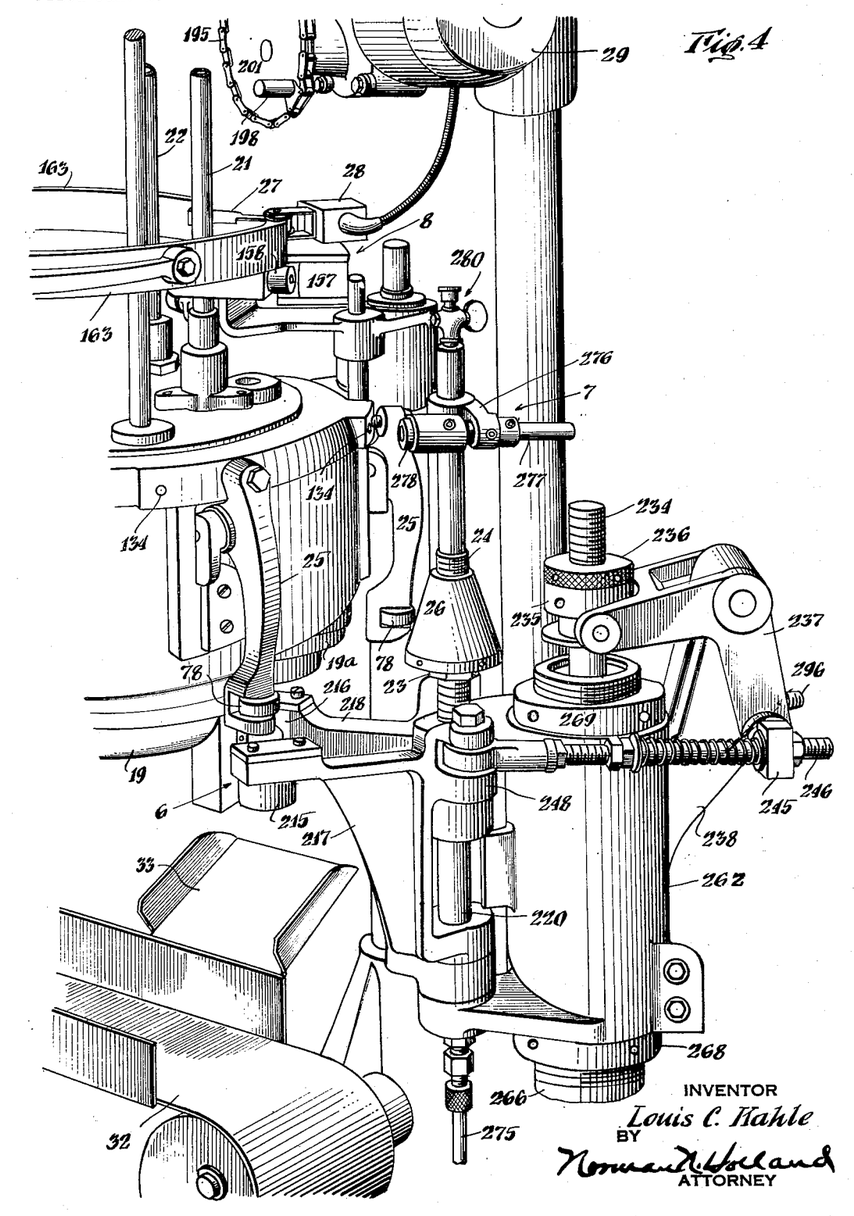
Fig. 4 is a perspective view showing a portion of the present machine adjacent the molding station thereof.
Figures 7, 8:
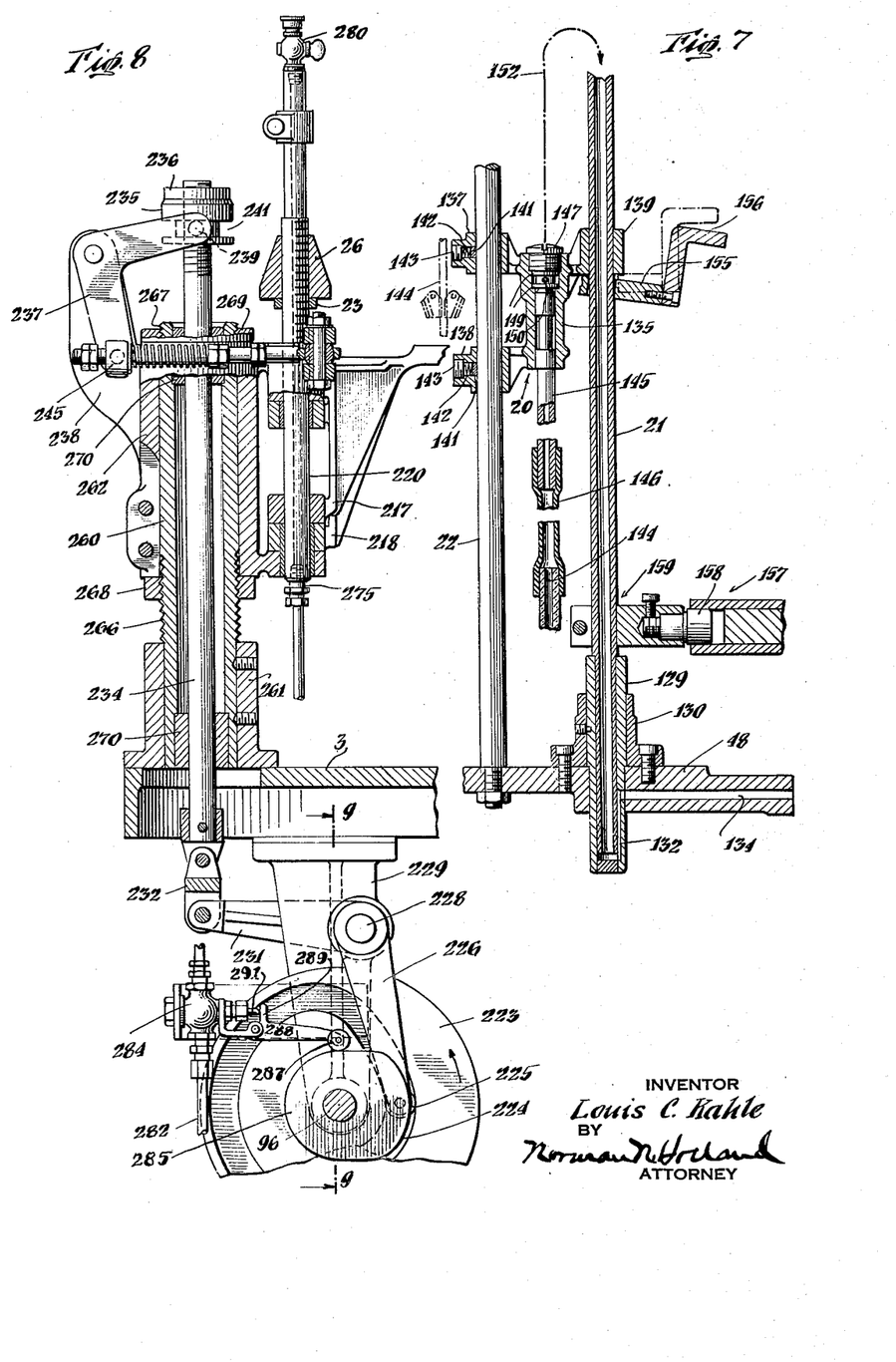
Fig. 7 is a fragmentary vertical sectional view, taken along line 7—7 of Fig. 5, showing a carriage which connects with a length of tubing and also the means for guiding and supporting the carriage.
Fig. 8 is a vertical sectional view showing a portion of the machine adjacent the molding station.
Figure 10:
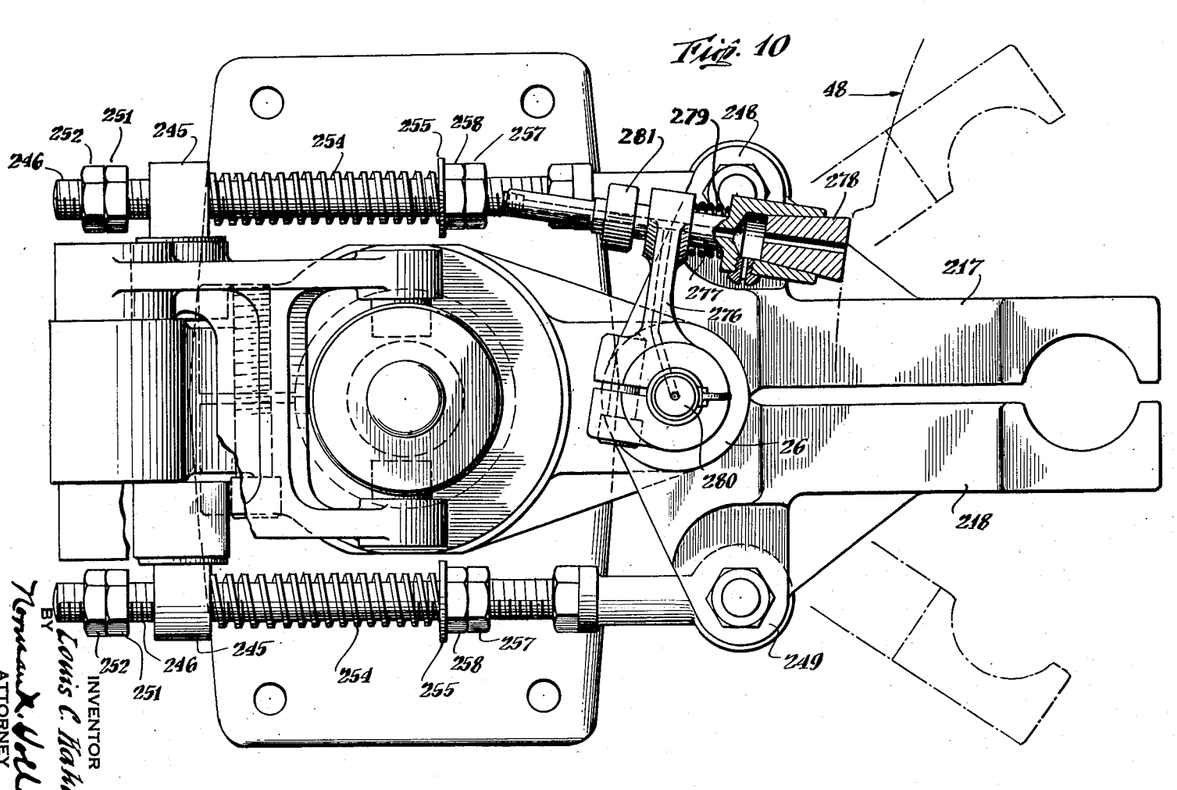
Fig. 10 is an enlarged top plan view, partly in section, of the portion of the machine illustrated in Fig. 8.

The molds and the mechanism for closing and opening them about the lower ends of glass tubes, as well as the means for delivering air to the upright hollow members 21, are shown more particularly in Figs. 4, 8 and 10.

In shaping the lower end of the tubing to form an article the lowermost end of the tubing is heated by the gas jet flames provided at the various stations 5 on the table 3 in advance of the molding means 6. Lower portions of the tubing are thus rendered soft and moldable and the bottom parts of it flow together to form a closed end. With the glass tube in this closed-end condition, the turret is indexed to position the glass end at the molding station 6.

At the molding station mold jaws close about the end of the tube and thereafter air is supplied to the interior of the tube so as to expand it to conform to the shape of the mold walls.

In Fig. 4 the mold halves 215 and 216 are shown bolted to arms or brackets 217 and 218, the latter arms being rotatable about the axis of an upright shaft 220. As illustrated in Fig. 4, the arms 217 and 218 are neither fully opened nor fully closed, but are shown in an intermediate position. When the molds are fully opened (as indicated by the dot-dash lines of Fig. 10) a chuck 19a may move a depending length of glass tubing to a position intermediate the halves, the halves being spaced sufficiently so as not to interfere with movement of the tubing into position. After the chuck 19a and its depending length of tubing are indexed into this molding position, the mold haves 215 and 216 come into contact with each other at their mating surfaces so as to enclose the lower end of the tubing.

Closing together of the mold halves is achieved by swinging the mold arms 217 and 218 about the axis of shaft 220, in accordance with rotation of index cam shaft 96, through the intermediation of cam 223 having a groove 224 at one face thereof, cam roller 225 which travels in groove 224, arm 226, shaft 228 carried by bracket 229 secured to the underside of stationary table 3, arm 231, also fastened to shaft 228, link 232, operating rod 234 having a collar 235 threaded to the upper portion thereof and retained in position by lock nut 236, bell crank 237 rotatably mounted on bracket 238 and having one end thereof provided with pins 239 fitting into groove 241 of the collar 235; portions at the opposite ends of bell crank 237 are pivotally connected with block members 245 that extend about operating arms 246, opposite ends of the operating arms being rotatably connected with projections or wings 248 and 249 of the respective mold operating arms 217 and 218. The block members may move to and fro along the operating arms 246, but are normally retained in position against stop nuts 251 and 252 by springs 254 which abut at one end against the block members 245 and at their other ends against washers 255 that are held in position by adjusting nuts 257 and 258.

As the index cam shaft 96 turns the cam 223, the operating rod 234 is raised and lowered and through the bell crank 237 moves the operating members 246 to and fro so as to swing the arms 217 and 218 about the shaft 220 so as to open and close the molds. The springs 254 provide a yieldable safety connection that permits movement of the parts after the mold jaws 215 and 216 have come together, and hence minimizes the possibility of damaging any parts of the machine by reason of any failure to obtain precise adjustment and dimension of parts operatively interposed between the cam shaft 96 and the mold jaws 215 and 216. The above referred to mechanism may be adjustably supported on an upright column 260 which is connected at its lower end with a supporting bracket 261 fastened to the table 3. A sleeve portion 262 which carries the mold arms and associated mechanism, as indicated in Fig. 8, may be adjusted to desired height on the column member 260 by threaded portions 266 and 267 to which are also threaded retaining nuts 268 and 269. Bushings 270 may be provided intermediate the operating rod 234 and the column member through which it extends for guiding the former member.

It will be understood that mold halves 215 and 216 having inner surfaces of any suitable shape may be utilized. The particular shape of any concave portions at the inner faces of the mold halves will depend upon the shape of the article to be manufactured.

When the mold halves are closed about the lower part of a glass tube, which extends down through complementary openings of the upper parts of the mold halves, air is delivered to the interior of the glass tube for inflating its lower portion so that it will expand into contact with the walls of the mold halves 215 and 216. As previously brought out this air reaches the interior of the glass tube through (Fig. 7) rubber tubing 146, hollow pin member 145, carriage 20, rubber tubing 152, upright hollow member 21, and the receiving conduit formed by recess 132 in socket member 129, and the lateral passageway 134 of the turret cover 48.

With the turret 17 at rest and the mold halves 215 and 216 closed, air is delivered to the lateral passageway 134 from an inlet conduit made up of a conduit 275, the hollow upright shaft 220, hollow arm 276 that is clamped on the upright shaft 220, hollow member 277, and washer or bushing 278. A spring 279 may encircle the member 277 to urge it yieldably outwardly; when the washer contacts the turret the member 277 may move slightly as the spring accommodates this. A collar 281 may be used to limit outward movement of the member 277 by the spring 279.

The air delivery conduit 275 may be supplied from an air line 282 through control valve 284. This control valve may be opened and closed by a cam 285 secured to the index cam shaft 96, through roller 287, arm 288, and projection 289 which operates a valve controlling plunger 291. In this manner air may be delivered through the hollow member 220, hollow arm 276, hollow member 277 and apertured washer 278 into the lateral turret passageway 134 in accordance with opening and closing of the mold jaws 215 and 216, the air being preferably cut off by valve 284 when the halves are open and the turret being indexed.

The arm 276 and its connected member 277 are fixedly secured to the rotatable upright shaft 220 and the latter is fixedly connected with a portion of mold arm 217, so that as this mold arm is swung by operating member 246, the upright hollow shaft 220 is correspondingly rotated. As the result, the hollow arm 276 and member 277 are swung toward and away from a side wall of the turret 17. When the mold halves are closed together, the outermost end of the rubber washer 278 is in firm contact with a terminal end or mouth portion of one of the lateral passageways 134 of the turret, so that air may pass into this lateral conduit and thence through the previously referred to conduits to the interior of the glass tube lower end portion enclosed by the mold halves 215 and 216.

One of the air inlet conduits in advance of the contacting washer 278 is preferably provided with a by-pass or venting valve 280, which may be selectively set to allow escape of desired amounts of air. By this means the quantity of air which enters a lateral turret passageway 134 may be controlled to thereby control the amount of air which reaches the lower end of a glass tube enclosed by the molds. If desired, the arm 276 may be solid instead of hollow and an upper portion of hollow member 220 may be connected with the hollow member 277 by a flexible length of tubing (not shown).

In instances where the article being formed has a square, octagonal, or other non-circular shape, the glass tubing should not be rotated while the molds 215 and 216 are closed. In this case the chuck jaws 51 should be released from engagement with the glass tubing. This may be accomplished by the conical cam 26 shown extending about the hollow member 220. The exterior surface of this cam is adapted to be contacted by the rollers on the chuck operating arm 25 to press the lower end of the arm inwardly and release the grip of the jaws 51; when the jaws are released the tubing is not rotated and may be inflated to conform with any desired non-circular shape at the interior of the mold.

The cam 26 is preferably threaded at its interior and cooperates with a corresponding thread 24 on the hollow member 220 for adjustably positioning the cam. A lock nut 23 may be used to retain a set position of the cam on the rod 220. By this construction the cam 26 may be adjusted in height along the member 220 so that a desired portion of its outer surface is contacted by an operating member 25 at the desired instant; when the cam is at a high elevation a large diameter portion of it actuates the chuck operating members 25 so as to open them early and retain them open for a relatively long period of time, and when the cam is at a lower elevation, a smaller diameter portion of it may contact an operating member 25 to hold the chuck jaws open for a shorter period of time.

While the above cam operating mechanism is particularly desirable in the manufacture of non-circular articles, it may, of course, be used in connection with the manufacture of articles which are circular, although its use in the latter instance is not essential.

(5) Elevating mechanism

During manufacture of articles the glass tubing is gradually used up and the carriage 20 and its supporting member 155 gradually move toward a lowermost position on the upright guide members 21 and 22. When the tubing has reached a sufficiently low position it is desirable that the carriages be automatically returned to the upper parts of the upright guide members 21 and 22 for insertion of a fresh length of glass tubing. In the present machine an elevating mechanism is provided for automatically returning the carriages 20 at the appropriate time.

The elevating mechanism is shown more particularly in Figs. 3, 4, 5, 12 and 13. As there shown the mechanism includes an upright member 193 secured by brackets 212 and 213 to a support column 211. The upright member 193 has a peripheral recess 194 forming a channel within which travels a roller chain 195. Flange members 197 bolted to the upright member 193 assist in retaining the chain within the channels and minimize the danger of injuring workmen. The chain 195 extends in an endless path around the upright member and around upper and lower sprockets 200 and 201. A pair of pins 198 are carried by and extend outwardly from the chain at spaced intervals and cooperate with an extension or projecting arm 156 on the carriage supporting member 155 for raising them and a carriage 20 at the appropriate time. Movement of the elevating chain 195 is achieved by drive motor 29, speed change gearing 205, and drive shaft 206 keyed to the drive sprocket 201.

The upright member and drive motor may be supported on a column 211 by brackets 212 and 213, the column being fastened to the stationary table 3. When a carriage 20 has moved downwardly to a sufficiently low position on its guide rods 21 and 22, a portion of the projecting arm 156 rotates into contact with an operating arm 27 of limit switch 28, so as to close an electrical circuit to the drive motor 29 and set it in operation. Limit switch 28 is located in a convenient position near the turret such as on track 157 (Fig. 4). At this time the under surface of the supporting member extension 156 is disposed over one of the extended pins (198 in Fig. 4) so that as the motor moves the chain the pin 198 will lift the carriage supporting means 155—156 and the particular carriage 20 which rests against the upper surface thereof.

This upward movement will continue until the rising extended pin comes into contact with a suitable operating arm 203 of the upper limit switch 30, at which time the electric circuit will be interrupted and the drive motor 29 will stop. In this raised position a fresh length of glass tubing may be readily inserted into the short downwardly extending rubber connection 146.

It is desirable that a carriage 20 commence its upward movement with the elevating mechanism before the chuck jaws 51 release their grip on a downwardly extending length of glass tubing, so that when the carriage and its connected length of rubber tubing 146 reach their top initial position a fresh length of tubing may be inserted without first removing any short piece of tubing. This is obtained (Fig. 5) by locating the operating arm 27 of the lower limit switch 28 so that it is contacted by a carriage 20 on its support member prior to the time a corresponding chuck operating arm 25 reaches the chuck releasing cam 188. When the short piece of glass tubing is held down by the chuck jaws a length of rubber tubing 146 may strip off its upper end; if desired, the upper part of the rubber connecting tubing 146 may be cemented or clamped into the hollow pin member 145. When the chuck reaches the cam 188, the short piece of tubing is released by the chuck jaws and drops onto a guide chute 33, which directs it onto the adjacent conveyor belt 32.

The support brackets 212 and 213 may be releasably clamped against the column 211 to permit swinging the elevating mechanism about the column to any desired position for contact of its elevating pins with an appropriate portion of a carriage or its supporting latch means.

(6) Severing of tubing

After the lower portion of a length of glass tubing has been shaped at the molding station, it is presented to the movable track section 157 which feeds carriage and tubing down a desired distance for cutting-off at a subsequent severing station. Prior to reaching the severing station, the tubing is heated adjacent the severing line to render it soft.

Figures 7A, 9A, 14, 15:
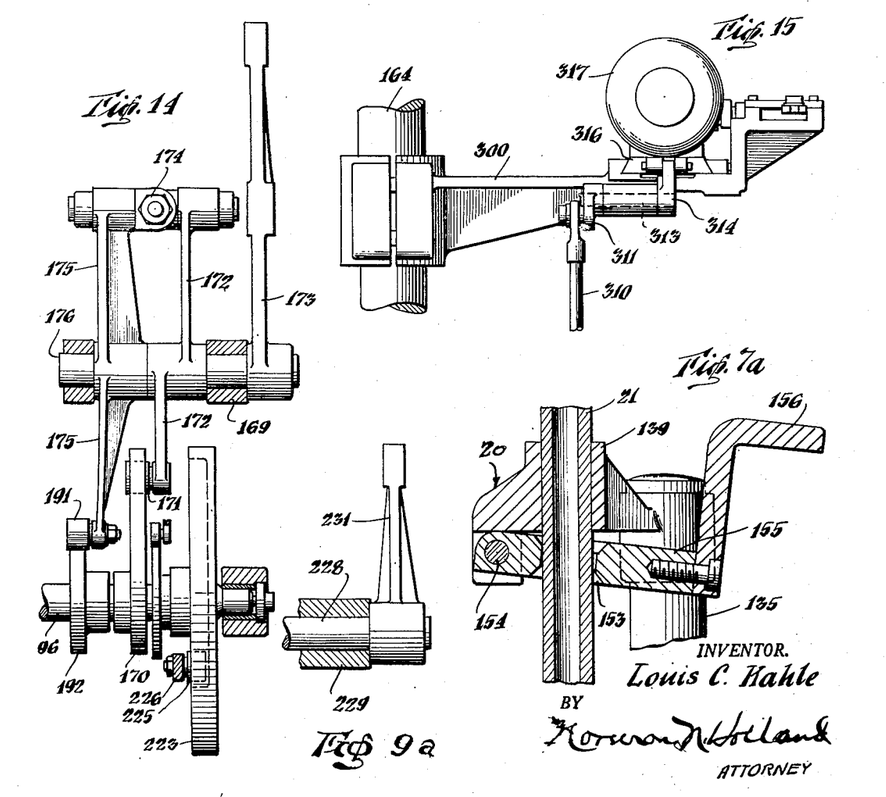
Fig. 7a is a fragmentary sectional view of a portion of the carriage supporting means shown in Fig. 7.
Fig. 9a is a fragmentary view, partly in section, showing the relationship of an operating arm illustrated at the lower part of Fig. 8.
Fig. 14 is a top plan view showing an arrangement of cams and arms for actuating the molding jaws and the feeding means.
Fig. 15 is an elevational view of the glass severing mechanism shown in plan at the upper left of Fig. 5.
Figures 9, 12, 13:
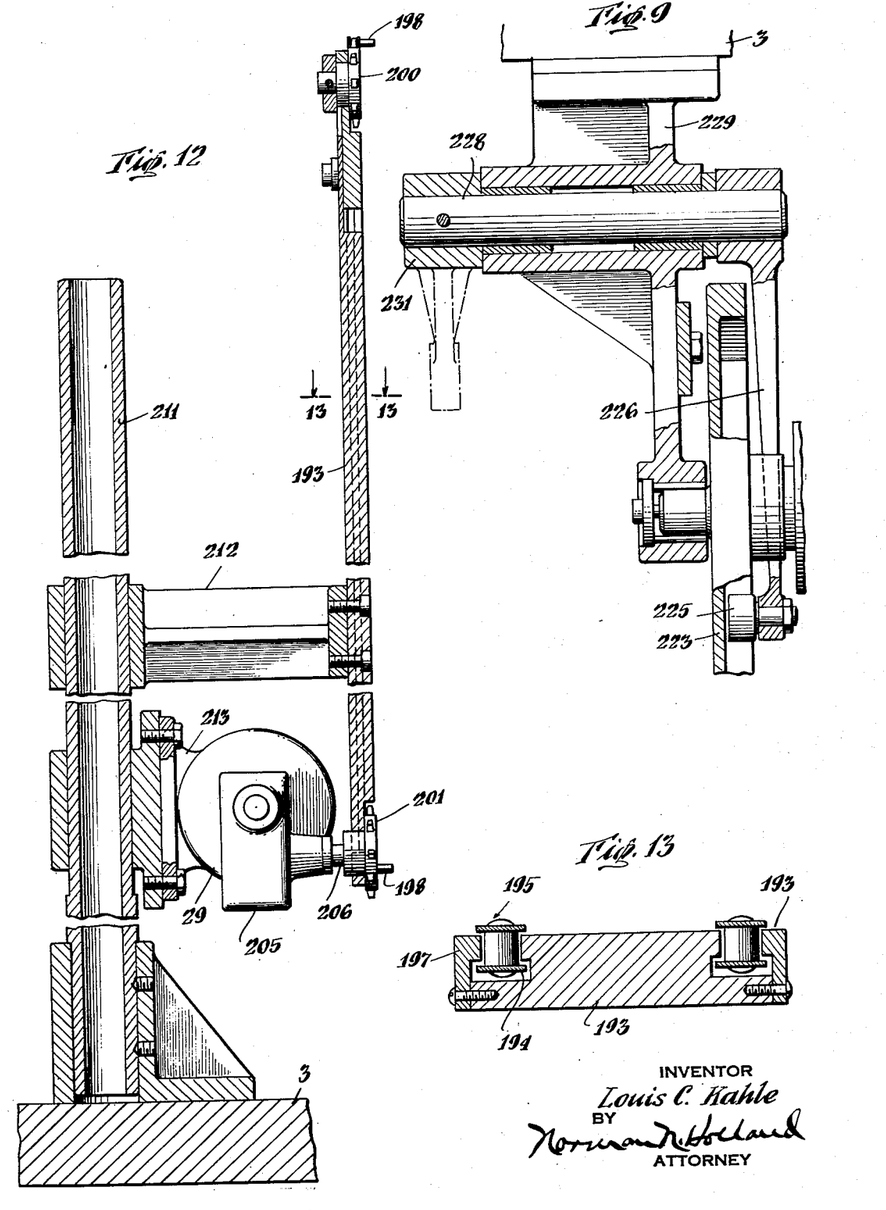
Fig. 9 is a vertical sectional view taken along the line 9—9 of Fig. 8.
Fig. 12 is a vertical sectional view of means for elevating a tube-supporting carriage.
Fig. 13 is a sectional view taken along line 13—13 of Fig. 12.
Figure 16:
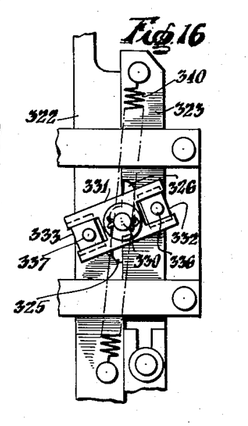
Fig. 16 is an enlarged fragmentary plan view of a portion of the severing means shown in Figs. 5 and 15.

While any suitable means may be utilized for severing the formed article from the tubing, there is shown in Figs. 5, 15 and 16 a device which may be used. As shown, the tubing is cut-off by a pair of knives 297 and 298 which move toward and away from each other at opposite sides of an intermediate length of tubing, the tubing being rotated by its supporting chuck during the severing operation.

The knives are supported on a bracket 300 carried by a track supporting member 164 and are actuated by a cam 301 secured to index cam shaft 96, through the intermediation of roller 302, arm 304, rotatable shaft 305 which extends through bracket 307 fastened to the underside of table 3, arm 308 which connects with and moves vertically a rod 310, crank 311 secured to shaft 313, fork 314, slide 316 which is supported on bracket 300 and has secured thereto drive motor 317, speed change mechanism 318, vibrator cam 319, roller 320 and knife slides 322 and 323. The knife slides 322 and 323 have cut-out portions 325 and 326 adjacent a pin 330 which is fastened to and extends upwardly from a portion of the stationary bracket 300; a slide-connecting member 331 extends about pin 330 and is provided with oppositely disposed guide slots for block members 332 and 333, which are in turn connected with the respective knife slides by upwardly projecting pins 336 and 337. A spring 340 connected at opposite ends thereof with the knife slides 322 and 323 tends to hold them together to urge toward each other the cutting edges of the knives 297 and 298.

When the motor slide 316 and connected motor are moved outwardly, as indicated by the arrow A, the knife slide 322 follows the vibrator cam 319 and causes the cutting edge of knife 297 to move toward a length of glass tubing which has been indexed into position. This outward movement of slide 322 causes the slide connecting member 331 to rotate in a clockwise direction so as to move the other slide member 323 and its knife 298 toward the oppositely disposed knife 297. Thus, the two knives approach each other and sever the intermediate rotating length of tubing. As rotation of the operating cam 301 causes the motor 317 to move in an opposite direction, a reverse action takes place and the knives separate from each other, so that a succeeding length of glass tubing may be indexed into position between the cutting edges of the knives. The vibrator cam 319 causes the knives to vibrate rapidly as they approach each other and this facilitates severing the intermediate tubing to give a "clean" cut.

In some instances, particularly where larger diameters of glass tubing are utilized to form relatively heavy articles, gas jets alone may be used to sever the tubing, in lieu of any mechanical cutting such as disclosed above. Where gas flames alone are employed, they will be directed against the tubing so as to melt it, the weight of the formed article being sufficient to separate it from upper portions of the tubing when the glass has been sufficiently melted.

(7) Operation

In the operation of the machine the turret rotates intermittently and presents the chucks with their lengths of glass tubing to the different stations on the stationary underlying table 3. At one station the chucks present the tubing to a cutting-off mechanism 12, shown at the upper left portion of Fig. 5. Here the blades 297 and 298 come together and sever the formed article from the lower end of the rotating length of glass tubing. When severed, the lower portion drops onto the guide chute 31 and is directed to the conveyor 32, which removes it to a box or other container. An inspector may be stationed along the path of the belt 32 to remove defective or broken articles. The lower end of the length of tubing which remains in a chuck is correctly positioned for forming by the mold halves and air delivery mechanism shown at the right side of Fig. 5 and in the perspective view of Fig. 4.

Before reaching the forming station the chucks are presented to a number of heating stations. As shown in Fig. 5, there are four of these heating stations 5 intermediate the severing location and the forming location. At the heating stations flame jets play upon the lower portion of the tubing which is held and rotated by the chucks, so as to render the glass sufficiently soft for ready shaping at the forming station.

At the forming station, the mold halves 215 and 216 (Fig. 4) come together about the lower portion of the glass tubing, the chuck jaws are opened by the cam 26 actuating the operating arm 25, and the air delivery shaft 220 is rotated to swing its arm 276 toward the turret 3 and to press the washer 278 against the turret so that air may be delivered through the arm 276 and washer 278 to the turret passageway 134. From this passageway the air goes up through the hollow elongated member 21 across a rubber hose or other flexible connection 152 to the interior of the carriage 20, and thence down through the hollow pin 145 and rubber connection 146 into the uppermost end of the length of tubing. The air then passes through the tubing itself to the lower portion thereof, which is surrounded by the mold halves 215 and 216, thus inflating the lower portion of the tubing and causing it to conform to the shape of the mold halves. At this time the chuck jaws may or may not be rotating. Where the configuration of the mold halves is such as to provide a non-circular shape on the formed article, it is essential that the chucks do not rotate the glass tubing; where the article to be formed has a generally circular shape, the chuck jaws may be allowed to rotate the tubing. The quantity of air reaching the lower portion of the glass tubing may be controlled by a relief valve 280 carried by the air delivery mechanism above the swingable arm 276. This relief valve may be set to allow the escape of any desired quantity of air prior to its delivery through the turret passageway 134 and thence to the lower end of the length of tubing. In this way, the article being formed at the lower end of the tubing may be expanded just the correct amount.

After forming the lower end of the tubing, the turret is indexed another step and presents a chuck tubing carriage to means for feeding the tubing a step downwardly. This is accomplished by having the roller 158, which is secured to the bracket 159 of the reciprocable hollow member 21, pass from beneath the stationary hold-down track 163 into the channel of a vertically reciprocable track section 157. This track section is moved up and down by the drive shaft 96 through the intermediation of suitable cams and arms. On the upward stroke of the track section 157, the elongated member 21 is raised through the opening of the support or latch member 155 carried by a tube supporting carriage 20. The carriage 20 remain in fixed position on the adjacent elongated member 22 while the member 21 is being raised. When the member 21 is moved downwardly, upon downward movement of the track section 157, the carriage support member 155 grips or bites against the outer surface of the member 21 and the carriage 20, together with its connected length of tubing 144, is lowered. The stroke of the track section 157, and thus the distance that a length of tubing is moved downwardly, may be controlled by the adjusting handle 179 (Fig. 11) which is operatively connected with the mechanism for raising and lowering the track. In order to allow the tubing to be fed downwardly the chuck jaws are opened prior to the downward movement by a chuck operating arm 25 coming into contact with stationary cam 188 located adjacent the periphery of the turret 3. This cam may be of appropriate shape and length to open the chuck jaws at the required instant and to maintain them opened for a desired length of time. Subsequent to being moved downwardly, the length of tubing is again heated by flame jets of gas burners at appropriate stations to facilitate cutting off by the severing means previously referred to.

When a carriage has moved down sufficiently far to have used up most of a length of glass tubing, a portion of the carriage or its supporting means 155 and 156 comes into contact with an operating arm 27 of a limit switch 28 to close an electric circuit and start the operating motor 29 of an elevating mechanism. The motor drives a chain 195 and a lifter pin 198 carried by the chain moves upwardly underneath the projecting arm 156 of the carriage support means. The chain and its projecting pin 201 continue to elevate a particular carriage until a portion of the pin or the projecting arm 156 come into contact with an upper switch-operating arm 203 and interrupts the circuit through an upper limit switch 30. This causes the motor 29 to stop. As the elevating chain 195 moves one pin 201 upwardly it also moves a second similar pin downwardly into position for elevating another carriage whenever its tubing is used up.

While the elevating mechanism is lifting the carriage 20, the chuck for that particular carriage remains closed about the particular length of glass tubing so that the tubing is held down; during upward movement of the carriage 20, its length of rubber tubing 146 is stripped off the upper end of the connected tubing. Subsequently the chuck jaws are opened and the short piece of tubing drops onto the guide chute 33 and then to the conveyor belt 32. These relatively short pieces of glass may be sent to scrap or formed articles may be salvaged for use.

It will be seen that the present invention provides a new and improved machine for manufacturing articles from length of tubing. The present machine may operate at relatively high speeds and is adapted to produce articles at rates as high as 2,400 per hour. The machine is fully automatic in operation, the only need for an operator being to insert fresh lengths of glass tubing subsequent to automatic elevation of a carriage after a particular length of tubing has been used up. No complicated valves and seals are required in connection with the delivery of air during shaping of an article. The machine is relatively simple in construction and operation and is readily adjustable for utilizing various sizes of tubing and for manufacturing various shapes of articles. The quantity of air delivery for shaping the articles may be readily controlled, and the machine is fully capable of withstanding any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention what I claim is:

1. A device of the class described comprising a rotatable turret, means carried by the turret for guiding a length of glass tubing, a conduit carried by the turret having a normally open terminal end at the turret and another end adapted to be connected with said length of glass tubing, an additional conduit in proximity to said turret and spaced from but movable into and out of communication with said terminal end to convey air to said first conduit and through the latter to the interior of the glass tubing, and means for moving said additional conduit into and out of said communication.

2. In a device of the class described, a rotatable turret, means carried by the turret at spaced intervals for holding and guiding and feeding lengths of glass tubing, conduits carried by the turret adjacent each of said holding and guiding means each having a normally open terminal end at the turret and another end adapted to be connected with a length of said glass tubing, an additional conduit in proximity to said turret spaced from but movable into and out of communication with said terminal ends one at a time to deliver air to said first conduits and through the latter to the interior of the glass tubing, means for intermittently moving said additional conduit into and out of said communication, means for shaping portions of said tubing during delivery of air thereto, means for separating shaped portions from the remainder of said glass tubing.

3. A device as claimed in claim 1, in which molding means is provided adjacent said turret for shaping a portion of the length of tubing during delivery of air thereto.

4. A device of the class described comprising a turret, means carried by the turret for guiding a length of glass tubing, an upright hollow member carried by the turret having an upper end adapted to be connected with an upper end of said glass tubing, a conduit carried by the turret having a portion in communication with the interior of said hollow member and having a normally open mouth, a second conduit adjacent said turret movable into and out of communication with said open mouth to deliver air thereto, and means adapted to shape a portion of the tubing during said air delivery.

5. A device of the class described comprising a rotatable turret, means carried by the turret at spaced intervals for guiding lengths of glass tubing, an upright hollow member carried by the turret adjacent each of said guiding means having an upper end adapted to be connected with an upper end of a length of said glass tubing, a conduit carried by the turret adjacent a lower end of each of said hollow members having a portion in communication with the interior of said hollow member and having a normally open mouth, a second conduit adjacent the periphery of said turret movable into and out of communication with said open mouths in succession adapted to deliver air thereto, means to shape a portion of the tubing during said air delivery, and means for rotating said turret to present the lengths of tubing in succession to said second conduit and shaping means.

6. In a device of the class described, a turret, tube guiding means carried by the turret at spaced intervals, elongated hollow members carried by the turret adjacent each of said tube guiding means, apertured tube supporting means movable lengthwise along said elongated hollow members adapted to be connected with said hollow members and with end portions of a tube for conducting air from the hollow members to the tube, conduits communicating with lower portions of said hollow members and terminating at an outer wall of said turret, means for intermittently rotating said turret to move said hollow members and conduits toward and away from an air delivery means, and means adjacent said outer wall of the turret movable into and out of registry with said conduits to deliver air to said conduits and hollow members during intervals while the turret is at rest.

7. A device of the class described comprising a rotatable turret, a plurality of guide means carried by the turret for guiding lengths of tubing through the turret, a hollow member carried by the turret adjacent each guide means, means movable along each of said hollow members adapted to be connected with end portions of said lengths of tubing for conducting air from the hollow members to the tubing, a plurality of laterally extending passageways carried by the turret having exposed outer ends and each in communication with a hollow member, additional means adjacent said turret adapted to deliver air to said passageways, means for intermittently moving said additional means into communication with said passageways adjacent their exposed ends, and means for intermittently rotating said turret to present said exposed ends of the passageways to said additional means.

8. A device of the class described comprising a rotatable turret, a plurality of means carried by the turret for holding and guiding lengths of tubing, operating members operatively connected with each of said means for releasing the hold on a length of tubing, a hollow member carried by the turret adjacent each of said means, means movable along each of said hollow members adapted to be connected with end portions of said lengths of tubing for conducting air from the hollow members to the tubing, a plurality of laterally extending passageways carried by the turret having exposed ends and each in communication with a hollow member, additional means adjacent said turret adapted to deliver air to said passageways, means for intermittently moving a portion of said additional means into communication with said passageways adjacent their exposed ends, means for intermittently rotating said turret to present said exposed ends of the passageways to said additional means, and means for moving said operating members to release the hold on a length of tubing while said additional means is in communication with one of the passageways.

9. A device as claimed in claim 7, in which molding means is provided adjacent said additional means for enclosing a portion of a length of tubing while air is delivered to a laterally extending passageway.

10. A device as claimed in claim 7, in which molding means is provided adjacent said additional means for closing about a portion of the tubing, and in which the means that moves said additional means into communication with a lateral passageway also serves to close the molding means.

11. A device as claimed in claim 7 in which each of said guide means comprises a chuck adapted to grip lengths of tubing.

12. A device as claimed in claim 7 in which said additional means is provided with selectively settable means for venting air to the atmosphere to thereby control the quantity of air entering a lateral passageway.

13. In a device of the class described having molding means for shaping a portion of a length of tubing, a rotatable turret, a plurality of chucks carried by the turret for holding lengths of tubing, a plurality of operating members for actuating the chucks to release lengths of tubing held by the chucks, a plurality of conduits movable with the turret for conducting air to the upper ends of lengths of tubing held by the chucks, each of said conduits having a normally open end at the turret, an air delivery conduit having an open end adjacent said turret, means for intermittently rotating said turret to present the open ends of the turret conduits to said air delivery conduit, means for moving the open end of said air delivery conduit into registry with the open ends of the turret conduits one at a time as the latter are presented to the delivery conduit, selectively settable cam means for moving said operating members to hold the chucks open during delivery of air from the delivery conduit to a turret conduit and a supporting shaft for said cam.

14. A device as claimed in claim 13, in which said operating members extend along exterior portions of the turret and the cam means has a general conical outer surface and is threadedly engaged with and adjustable along said supporting shaft.

15. In a device of the class described having means for severing molded portions from lengths of glass tubing, a rotatable turret, means carried by the turret at spaced intervals adapted to hold lengths of glass tubing, a pair of elongated members carried by said turret adjacent each of said holding means, one of said elongated members adjacent each holding means being hollow, a carriage carried by and movable lengthwise of the elongated members having portions adapted to be connected with said hollow member and with a length of tubing for conducting air from the hollow member to said tubing, means for intermittently reciprocating one of said elongated members of each pair to thereby lower said carriage, molding means adapted to close about portions of said lengths of glass tubing in succession, conduits carried by the turret for conducting air to said hollow members, and means movable successively into communication with said conduits for conveying air thereto and to the hollow members while the molding means is closed about a length of tubing to thereby inflate portions of the tubing so as to conform to said molding means.

16. A device of the class described comprising a rotatable turret, means carried by the turret at spaced intervals adapted to hold lengths of glass tubing, a pair of upright members carried by the turret adjacent each of said holding means, one of each pair of said upright members being hollow, a carriage carried by and movable lengthwise of each pair of upright members having portions adapted to be connected with said hollow member and with a length of tubing for conducting air from said hollow member to said tubing, said carriage gripping an upright member upon lowering thereof but releasing it on raising thereof, means for intermittently raising and lowering said hollow member of each pair of said members to thereby lower said carriage therealong, shaping means adapted to extend about portions of said lengths of tubing, means adjacent said turret including a separate receiving conduit corresponding to each of said hollow members and a single inlet conduit adapted to deliver air to lower portions of said hollow members in succession to thereby inflate portions of the tubing while enclosed by said shaping means, and means to bring said inlet conduit into contact successively with each of said receiving conduits to allow the passage of air from said inlet conduit to said receiving conduits.

17. In a device of the class described, the combination of a rotatable turret, tubing guide means carried by the turret, an elongated hollow member slidably mounted on the turret adjacent said guide means, tubing support means movable lengthwise of said elongated member having a ratchet connection with said elongated member and having portions connecting said elongated member with a length of tubing to conduct air from said elongated member to the tubing, an arm secured to and projecting laterally from said elongated member, and reciprocable means adjacent said turret adapted to register with said arm for moving it and said elongated member to and fro to feed the tubing support means toward the turret.

18. In a device of the class described having molding means for shaping portions of tubing, the combination of a rotatable turret, tubing guide means carried by the turret, an elongated hollow member slidably mounted on the turret adjacent said guide means, tubing support means carried by and movable lengthwise of said hollow member having a ratchet connection with said elongated member and having portions connecting with an upper part of the hollow member and with a length of tubing to conduct air from the hollow member to the tubing, an arm secured to and projecting laterally from said hollow member, reciprocable means adapted to register with said arm for moving it and said hollow member to and fro to feed the tubing support means toward the turret, an air inlet conduit connected with the interior of said hollow member, an air delivery conduit adjacent said turret and normally spaced from said inlet conduit, and operating means for rotating said turret and actuating said reciprocable means and bringing said conduits into communication with each other all in timed relationship.

19. A device as claimed in claim 17, in which a stationary track extends along the path of movement of said elongated hollow member and said arm and holds them against said to and fro movement during rotation of the turret at all times other than when the arm is in registry with said reciprocable means.

20. In a device of the class described, the combination of a rotatable turret, tube guiding means carried by the turret, an elongated member slidably mounted on the turret adjacent said guiding means, tube supporting means carried by and movable lengthwise of said member having a ratchet connection with said member, means for reciprocating said elongated member and thereby effecting movement of the tube supporting means toward the turret, and elevating means generally parallel with said elongated member having a portion for extending into the path of movement of said tube supporting means for contacting a portion of the tube supporting means and moving it along the elongated member away from a position adjacent the turret to a position adjacent an outer end of said elongated member, and means responsive to the tube supporting means reaching a position adjacent the turret to activate said elevating means.

21. In a device of the class described, the combination of a rotatable turret, tube guiding means carried by the turret, an elongated member slidably mounted on the turret adjacent said guiding means, tube supporting means carried by and movable lengthwise of said member having a ratchet connection with said member, a projecting arm on said ratchet connection, means for reciprocating said elongated member and thereby effecting movement of the tube supporting means toward the turret, and elevating means generally parallel with said elongated member having a projecting pin extending into the path of movement of said tube supporting means for contacting said projecting arm and moving the tube supporting means along the elongated member away from a position adjacent the turret to a position adjacent an outer end of said elongated member, and means responsive to the tube supporting means reaching a position adjacent the turret to activate said elevating means.

22. In a device of the class described, the combination of a rotatable turret, tube guiding means carried by the turret, an elongated member slidably mounted on the turret adjacent said guiding means, tube supporting means carried by and movable lengthwise of said member having a ratchet connection with said member, a projecting arm on said ratchet connection, means for reciprocating said elongated member and effecting movement of the tube supporting means toward the turret, an endless conveyor disposed adjacent and generally parallel with said elongated member having a projecting pin extending into the path of movement of the tube supporting means for contacting said projecting arm when the tube supporting means is adjacent the turret and moving the tube supporting means away from the turret to a position adjacent an outer end of said elongated member, and means responsive to the supporting means reaching a position adjacent the turret to activate said conveyer.

23. In a device of the class described having means to mold portions of a glass tube, a rotatable turret, rotatable tube holding means carried by the turret, a plurality of elongated members mounted on the turret adjacent said holding means, one of said members having a passageway lengthwise thereof adapted to convey air and being slidably mounted on said turret, tube supporting means carried by and movable lengthwise of said elongated members having a ratchet connection with said slidably mounted member, an arm projecting laterally from said slidably mounted member, reciprocable means adapted to register with said arm for moving it and its elongated member toward and away from the turret to feed the tube supporting means toward the turret, means adapted to deliver air to a lower portion of said passageway, and means for indexing the turret and rotating the tube holding means and intermittently moving the reciprocable means and intermittently delivering air to said lower portion of the passageway, all in timed relationship.

24. In a device of the class described having means for molding portions of a glass tube, a rotatable turret, tube holding means carried by the turret, a plurality of elongated members mounted on the turret adjacent said holding means, one of said members being hollow and being slidably mounted on said turret, tube supporting means carried by and movable lengthwise of said elongated members having a ratchet connection with said slidably mounted member, an arm projecting laterally from said slidably mounted elongated member, reciprocable means adapted to register with said arm for moving it and its elongated member toward and away from the turret to feed the tube supporting means toward the turret, means adapted to deliver air to a lower portion of said hollow member for inflating portions of said tube, an endless chain disposed generally parallel to said elongated members having a projecting pin adapted to contact a portion of the supporting means and move it away from the turret and said molding means to a position adjacent upper ends of said elongated members for inserting a fresh length of glass tubing, an electric motor for moving said endless chain, a switch adapted to be contacted by a portion of the tube supporting means when the latter reaches a position adjacent the turret to initiate operation of said electric motor, and a second switch adjacent upper ends of said elongated members adapted to stop operation of the electric motor.

LOUIS C. KAHLE.

References Cited in the file of this patent

UNITED STATES PATENTS

| Number | Name | Date |
| --- | --- | --- |
| 1,165,884 | La France | Dec. 28, 1915 |
| 1,262,567 | Rippl | Apr. 9, 1918 |
| 1,330,707 | Hoffstetter et al. | Feb. 10, 1920 |
| 1,342,821 | Leiman | June 8, 1920 |
| 1,532,077 | Quackenbush et al. | Mar. 31, 1925 |
| 1,546,353 | Rippl et al. | July 14, 1925 |
| 1,587,466 | Brown et al. | June 1, 1926 |